United States Patent Office 3,461,400
Patented Aug. 12, 1969

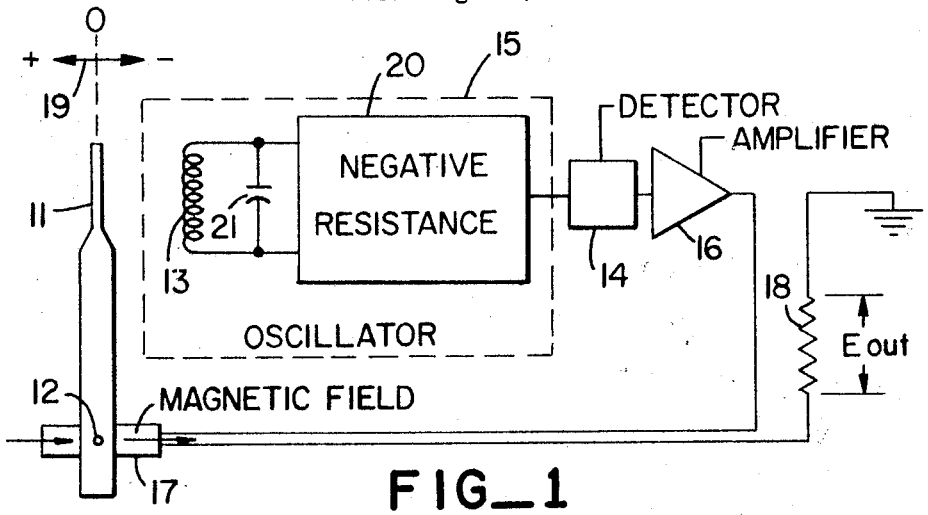
FIG_1
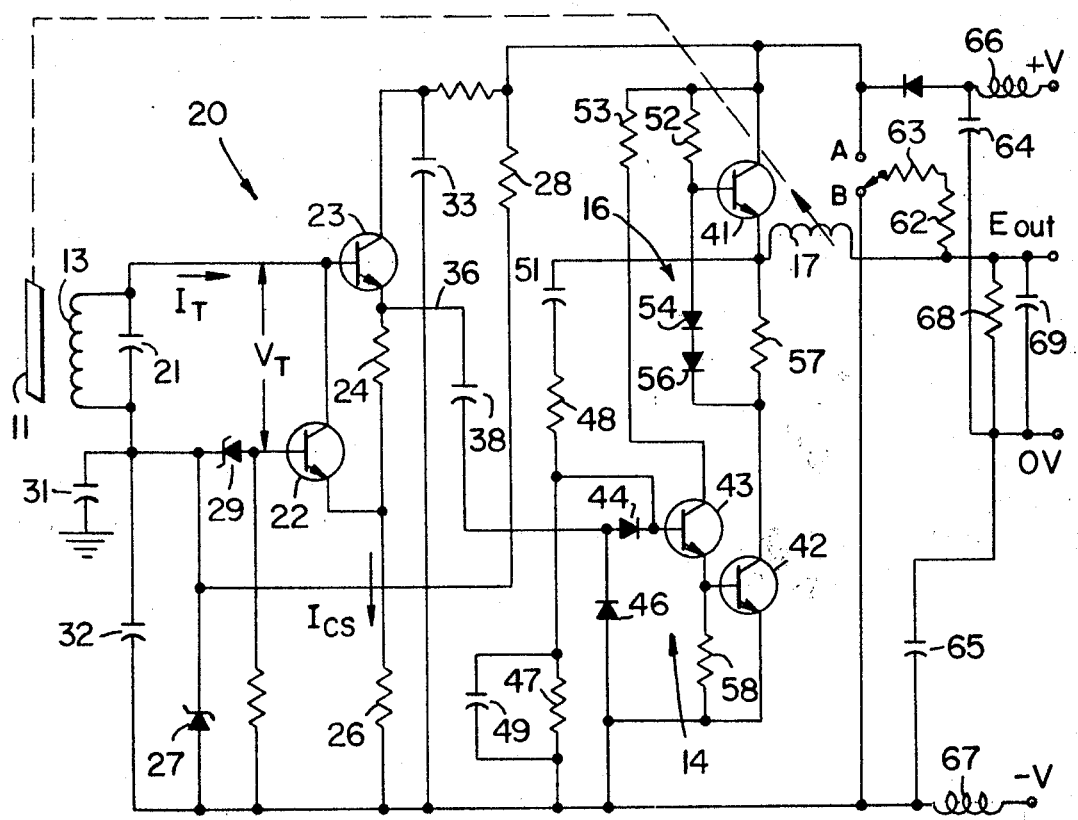
FIG_2
INVENTOR.
EIJI KODA

3,461,400
POSITION DETECTING APPARATUS
AND METHOD
Eiji Koda, Concord, Calif., assignor to Systron-Donner Corporation, Concord, Calif., a corporation of California
Filed Aug. 30, 1967, Ser. No. 664,373
Int. Cl. G01n 27/02; G08c 21/00
U.S. Cl. 331—65     7 Claims

ABSTRACT OF THE DISCLOSURE

A position detecting apparatus and method having a movable metal paddle coupled to an inductive pick-up circuit which is part of a tuned circuit coupled to a negative resistance device forming an oscillator. The rectified output of the oscillator drives an amplifier which when the paddle departs from a null position provides plus or minus currents to a restoring torque coil also coupled to the paddle. The value of the restoring current is a measure of the displacement of or the amount of acceleration applied to the paddle. The negative resistance device contains a passive resistor which determines the amplitude of oscillation at the normal null position of the paddle thereby providing a stable position reference for the null position.

---

This invention relates to position detecting apparatus and method and more particularly to apparatus and a method suitable for measuring acceleration forces.

Accelerometer devices of the type disclosed in Patent 3,074,279 entitled "Position Detecting Transducer" by Harold D. Morris and assigned to the present assignee have required expensive and time consuming methods of construction to produce a device having a nominally zero temperature coefficient at the null or zero spacing position.

In general, it is an object of the present invention to provide a position detecting apparatus with a substantially zero temperature coefficient at null which is inexpensive and has good performance characteristics.

Additional objects of the invention will appear from the following description.

In accordance with the above object there is provided a position detecting apparatus for measuring the displacement of a member from a predetermined null position, the apparatus being of the type having a tuned circuit including an inductive component which is in proximity to the displaceable member and is responsive to the displacement of this member toward or away from the component to increase or decrease the electrical losses of the tuned circuit. The tuned circuit itself has a particular dissipative loss when the displaceable member is in a null position which is represented by an equivalent positive resistance of predetermined value. The improvement of the invention comprises a negative resistance device, having passive circuit means, which is coupled to the tuned circuit and has a normal predetermined negative resistance value equal to the predetermined resistance value and forms an oscillator having a predetermined stable amplitude of oscillation when the displaceable member is in its null position. The normal predetermined negative resistance value is substantially determined only by the passive circuit means of the negative resistance device. The amptitude of oscillation of the oscillator increases or decreases with movement of the displaceable member from its null position.

Amplifier means are coupled to the oscillator and are responsive to the amplitude of oscillation for producing a zero D.C. signal output when the ampltiude of oscillation is at its predetermined stable level and for producing signal outputs of either positive or negative polarity corresponding to an increase or decrease in the oscillation amplitude.

The invention will become more clearly apparent when taken in conjunction with the accompanying drawing.

Referring to the drawing:
FIGURE 1 is a block diagram of a position detecting apparatus incorporating the present invention; and
FIGURE 2 is a schematic diagram of FIGURE 1.

An accelerometer system embodying the present invention is illustrated in FIGURE 1 which operates on Newton's second law of motion. More specifically, a paddle or moving vane device 11 acts as a seismic mass or massive pendulous element which is free to pivot about point 12 and is located in close proximity to an inductive pick-off coil 13. The paddle has a null position indicated as 0 and is free to move between + and — limits as shown at 19. The losses of the inductive coil are determined by the eddy currents induced in the paddle which in turn are determined by the closeness of the paddle to the pick-off coil 13.

Inductive pick-off coil 13 is part of a tuned tank circuit including a capacitor 21 which determines the operating frequency of the tank circuit. Tank circuit 13, 21 has an equivalent positive resistance of predetermined value when paddle 11 is in its zero or null position. This positive resistance value decreases or falls for displacement in the position direction and increases or rises for displacement in the negative direction.

Coupled to tank circuit 13, 21 and forming an oscillator 15 is a negative resistance device 20. The oscillator has, as discussed above, an output amplitude which is proportional to the displacement of the paddle from its neutral or null position since the positive resistance loading varies directly as spacing. This output is coupled through a detector 14 to an amplifier 16 and is fed through a torque coil 17 connected in such polarity and situated in a magnetic field as to restore the paddle back to the original null position. The torque coil current necessary to zero the position of the mass is proportional to the acceleration torque acting on the pendulous mass and therefore to the acceleration and may be measured as a voltage, $E_{out}$, across a resistor 18 that is in series with the torque coil.

Referring now to the circuit schematic of FIGURE 2, negative resistance device 20 comprises transistors 22 and 23. The collector of transistor 22 is coupled to the base of transistor 23 and the emitter of transistor 22 is coupled to the emitter of transistor 23 through a series connected resistor 24. As will be discussed below, resistor 24 determines the negative resistivity of the negative resistance device. A resistor of high temperature stability of the metal film type is to be used to minimize temperature sensitivity.

The emitter of transistor 22 is coupled to a negative voltage source, —V, through a series connected resistor 26 which carries a constant current, $I_{cs}$, as shown hereinafter. The magnitude of the current through resistor 26 is determined by a zener diode 27 coupled between —V voltage line and a positive voltage source +V, through resistor 28. In addition, the cathode of diode 27 is coupled to the cathode of a second zener diode 29 whose anode is coupled to a base input of transistor 22. The cathode of diode 29 coupled to one side of tank circuit capacitor 21 is also grounded through a by-pass capacitor 31. A second capacitor 32 which is coupled between the same side of the tank circuit and —V also serves as a by-pass capacitor. Zener diode 29 provides the bias between transistors 22 and 23 to determine the current flowing through resistor 24. A capacitor 33 coupled between +V and —V is a by-pass capacitor.

Transistors 22 and 23 with their associated components serve as a negative resistance device which in combination with tank circuit 13, 21 forms an oscillator. Resistors 24 is a passive circuit element which determines the negative resistance value of the oscillator as mentioned above and when the equivalent positive resistance of tank circuit 13, 21 as determined by the null position of paddle 11 is equal to the negative resistance, the circuit will oscillate at a stable amplitude of oscillation. Such amplitude of oscillation corresponds to the output signal between the emitter of transistor 23 and $-V$ and is conducted on a line 36 which is coupled to amplifier 16 through coupling capacitor 38.

Amplifier 16 includes a transistor output stage including transistors 41 and 42. Transistor 42 is driven by a transistor 43 which has as a base input the output on line 36 from the negative resistance device 22, 23. This input is coupled to transistor 43 through detector 14 which includes voltage doubler detector diodes 44 and 46, diode 44 being coupled in series to the base input and diode 46 in parallel to $-V$. The resistor 58 coupled to the emitter of transistor 43 determines the operating current of transistor 43. Appropriate biasing and by-pass is provided by resistors 47 and 48 coupled to the base and emitter of transistors 43 and 41, respectively; capacitor 49 by-passes resistor 47, and a capictor 51 in series with resistor 48 provides D.C. isolation for the emitter of transistor 41. Resistor 52 coupled to the base of the transistor 41 is a driving resistor and resistor 53 is a current limiter. A pair of series connected diodes 54 and 56 couple the base of transistor 41 to the collector of transistor 42. A resistor 57 couples the emitter of transistor 41 and the collector of transistor 42. The output of amplifier 16 is coupled from the emitter of transistor 41 to torque coil 17 and thence through sampling resistor 68 to ground. The voltage developed across resistor 68 is $E_{out}$ and represents an acceleration force.

The output of amplifier 16 after being coupled through torque coil 17 is shunted by an off-set adjustment network comprising series connected resistors 62 and 63 having one end terminated on the output line $E_{out}$ and the other end selectively connevted either to points A or B which are connected to $+V$ and $-V$, respectively. This adjustment is made during construction of the device and compensates for any torque coil currents which may be present due to non-acceleration induced spurious torques.

Capacitors 64 and 65 are series connected between $+V$ and $-V$ and in combination with series connected inductors 66 and 67 provide radio frequency filtering action.

Resistor 68 coupled to the $E_{out}$ line determines the scale factor for any monitoring device which may be coupled to the $E_{out}$ terminal for reading acceleration. A capacitor 69 also coupled to the output line and to the zero volt or ground level line provides a phase lead or compensation for stabilization of the feedback control loop.

In operation the negative resistance device comprising transistors 22 and 23 and associated circuits functions in the following manner. Transistor 22 is connected as an emitter follower voltage amplifier and has a theoretical gain of unity. Transistor 23 with a grounded base has a current amplification factor of approximately unity since whatever current is drawn through the emitter also flows through the collector of the same transistor. With this circuit configuration resistor 24, which is coupled between the emitters of transistors 22 and 23, determines the value of a negative resistance which the entire circuit represents. Thus the characteristic negative resistance of the two transistor amplifiers is substantially defined by the single passive resistor 24 rather than by the critical characteristics of the transistors themselves. In other words, the transistors 23 and 22 are required only to act in their gross fashion as a voltage amplifier with a gain of one and as a current amplifier with a gain of one, respectively.

The negative resistance amplifier acts as a two terminal device, with the input base connections to transistor 22 and 23 as the input terminals. With a voltage $V_T$ across this input, a current, $I_T$ flows into the device. In operation, an increase in terminal voltage $V_T$ causes a decrease in the input current $I_T$ which is in effect the collector current of transistor 22. $I_T$ is thus equal to the steady state current $I_{cs}$ through resistor 26 as reduced by the current in resistor 24. Such current is the quotient of $V_T$ and the value of resistor 24 which determines the effective negative resistance. The voltage across resistor 24 as it appears on line 36 changes directly as $V_T$ since transistor 23 directly drives line 36. Thus the voltage $V_T$ on output line 36 causes a change of current in resistor 24 which is directly proportional to $V_T$. This current is subtracted from $I_{cs}$ by transistor 22 and is caused to flow in the input as $I_T$.

From a practcal standpoint $I_T$ varies in accordance with the amount of positive resistance or losses created by the moving paddle since this current attempts to bring the oscillatory system back to its proper level of oscillation where its A.C. output voltage on line 36 is sufficient to produce the correct current through the torque coil 17.

A more detailed analysis of a typical negative resistance circuit is described by C. D. Todd in the magazine Semiconductor Products in the May and June issues of 1963.

Continuing with the operation of the device, as the paddle 11 moves back and forth from its null position in accordance with acceleration forces, higher or lower effective positive resistance is produced, causing changes in the amplitude of oscillation. This is caused by the needed change in the effective negative resistance device which change itself is caused by the nonlinearities in the circuit. These, of course, are present to some extent in all circuits. The nonlinearities will cause the total loop gain of the oscillator circuit to return to one. If the paddle 11 moves away from its null position, for example, the negative resistance amplifier will be driven harder producing a greater current output which produces a current in the torque coil 17 to return the moving member or vane 11 to its null position. Such current may be of either positive or negative polarity depending on the direction of displacement of the paddle member. Thus the circuit basically operates on an equality or inequality between the positive resistance of tank circuit 13, 21 and the negative resistance device 22, 23. Moreover, since the negative resistance device has its resistance basically determined substantially only by the passive resistive element 24, this results in a very temperature stable circuit which fulfills the object of the present invention.

To express the operation of the circuit in another manner, the circuit is such that the negative value resistance must always finally come into equality with the effective positive resistance of the tank circuit. This is a stable condition. When the negative resistance value is larger or smaller than the positive, the amplitude of the oscillator increases or decreases until a stable condition is again achieved where the negative resistance value is equal to the positive resistance value. In other words, the amplitude of oscillation increases or decreases with movement of the paddle member from its null position.

Thus the present invention provides a position detecting apparatus and method which by use of an oscillator having a negative resistance device of the foregoing characteristics yields a system with an inherently stable zero or null position and a substantially zero temperature coefficient for the null position.

I claim:

1. A position detecting apparatus for measuring the displacement of a member from a predetermined null position, the apparatus being of the type having a tuned circuit including an inductive component which is in proximity to said member and is responsive to displacement of the member toward or away from the component to increase or decrease the losses of the tuned circuit, said tuned circuit having a loss when said member is in said null position represented by an equivalent positive resistance of predetermined value; the improvement comprising a negative resistance device having passive circuit means coupled to said tuned circuit and having a normal predetermined negative resistance value equal to said predetermined positive resistance value and forming an oscillator having a predetermined stable amplitude of oscillation when said member is in said null position, said normal predetermined negative resistance value being substantially determined only by said passive circuit means of said negative resistance device, said amplitude of oscillation increasing or decreasing in proportion with the degree of movement of said member from said null position, and amplifier means coupled to said oscillator and responsive to the amplitude of oscillation for producing a zero level signal output when said amplitude is at said predetermined stable level and for producing signal outputs of either positive or negative polarity corresponding to an increase or decrease in said amplitude.

2. A position detecting apparatus as in claim 1 in which said passive circuit means is a resistor.

3. A position detecting apparatus as in claim 2 in which said resistor is of the thin film type.

4. A position detecting apparatus as in claim 1 including feedback means coupled to the output of said amplifier means and including a restoring coil immersed in a magnetic field coupled to said displaceable member and responsive to current from said feedback means for applying a restoring force to said displaceable member to restore it to its initial null position.

5. A position detecting apparatus as in claim 1 in which said negative resistance device comprises a first transistor serving as a voltage amplifier having a substantially unity gain and a second transistor coupled to said first transistor serving as a current amplifier having a substantially unity gain.

6. A position detecting method for determining the displacement of a movable member from a null position in which positive and negative resistance means are coupled together to form a negative-resistance oscillator whose amplitude of oscillation is indicative of displacement of said member, the positive resistance including a tuned circuit having an inductive component which is in proximity to the movable member, the component being responsive to displacement of the member toward or away from the component to increase or decrease the losses of the tuned circuit and thereby in effect change the equivalent positive resistance of the tuned circuit, the tuned circuit having an equivalent positive resistance of a predetermined value when said member is in a null position, said amplitude of oscillation being of a predetermined value when said positive resistance is equal to said negative resistance when said member is in said null position, the negative resistance of said negative resistance means being determined substantially only by passive circuit means included therein, said method comprising the following steps: displacing said movable member from its null position to vary said positive resistance; and compensating for said variation of said positive resistance by varying said negative resistance means, such variation of said negative resistance means causing a proportional change in said predetermined amplitude of oscillation whereby the degree of displacement of said member is indicated as a proportional change of said amplitude change.

7. A method as in claim 6 including the step of restoring said movable member to said null position.

References Cited

UNITED STATES PATENTS 2,907,931   10/1959   Moore _____ 331—115 X

OTHER REFERENCES

Appleby: "A Transistorized Resistance-Capacitance Selective Network," Electronic Engineering, November 1964, pp. 746–749.

ROY LAKE, Primary Examiner

SIEGFRIED H. GRIMM, Assistant Examiner

U.S. Cl. X.R.

73—517; 324—40; 331—115; 117; 340—262, 266